Aug. 20, 1957 H. F. HART ET AL 2,803,187
DUPLICATING, PRINTING, AND PUNCHING MACHINE
Filed June 7, 1954 6 Sheets-Sheet 1

INVENTORS
HERBERT F. HART
ROY LINDBERG
ROBERT E. HOPP
BY Percy Freeman
ATTORNEY.

Aug. 20, 1957    H. F. HART ET AL    2,803,187
DUPLICATING, PRINTING, AND PUNCHING MACHINE
Filed June 7, 1954    6 Sheets-Sheet 2

INVENTORS
HERBERT F. HART
ROY LINDBERG
ROBERT E. HOPP
BY
*Percy Freeman*
ATTORNEY.

Aug. 20, 1957 H. F. HART ET AL 2,803,187
DUPLICATING, PRINTING, AND PUNCHING MACHINE
Filed June 7, 1954 6 Sheets-Sheet 3

INVENTORS
HERBERT F. HART
ROY LINDBERG
ROBERT E. HOPP
BY
ATTORNEY.

INVENTORS.
HERBERT F. HART
ROY LINDBERG
ROBERT E. HOPP

INVENTORS
HERBERT F. HART
ROY LINDBERG
ROBERT E. HOPP
BY Percy Freeman
ATTORNEY.

United States Patent Office 2,803,187
Patented Aug. 20, 1957

2,803,187

DUPLICATING, PRINTING, AND PUNCHING MACHINE

Herbert F. Hart, Poughkeepsie, Roy Lindberg, Baldwin, and Robert E. Hopp, Poughkeepsie, N. Y., assignors to Bobrich Products Corp., New York, N. Y., a corporation of New Jersey Application June 7, 1954, Serial No. 435,028

8 Claims. (Cl. 101—19)

This invention relates to a stamping and punching machine for recording information relating to sales on an invoice form.

The invention has particular application to transactions at gasoline service stations and it involves the use of customers' credit cards. It is the present practice of large gasoline and oil companies to provide the ultimate consumers of their products with credit cards. These cards generally bear information identifying the holder of the card, giving his name, address and account number. When a purchase of gasoline or the like is made at a service station honoring such credit card, the service station attendant is required to fill out an invoice form in longhand, transferring thereto the information contained on the credit card and also providing information as to the sale itself, that is, the number of gallons of gasoline or oil purchased and the price. The invoice form consists of several identical or substantially identical sheets or leaves and one is handed to the purchaser, one is retained by the service station and the third is delivered to the gasoline or oil company which had issued the credit card to the customer. These several copies are, of course, carbon duplicates of each other.

This procedure has many drawbacks. In the first place, it is very time consuming and service station attendants are frequently prone to dealing with cash customers first and leaving the credit customers until later. This is especially true of very busy service stations since a cash transaction consumes only a fraction of the time consumed by a credit transaction. Another drawback resides in the fact that errors in transcribing the information from the credit card to the invoice are occasionally made, more frequently by some attendants, less frequently by others. This is especially true in less developed areas where the service station attendants are relatively illiterate and find it difficult to transcribe the information accurately. It is the responsibility of the service station making the sale to provide accurate information on the invoice form and where mistakes are made and it becomes impossible to identify or trace the purchaser from the information on the invoice form, the gasoline or oil company refuses to honor the transaction and the service station sustains the loss.

It will appear from the foregoing that this type of credit transaction is distasteful to the ultimate consumer since the service which is rendered to him frequently falls below the level which is accorded cash customers. It is distasteful to the service station since it is time consuming and, on occasion, productive of losses resulting from errors in preparing the invoice forms. And it is also distasteful to the gasoline and oil companies since their business suffers by reason of consumer dissatisfaction and service station dissatisfaction as above outlined. It has long been known that new means and methods of streamlining credit transactions must be developed if the use of credit at service stations and similar places of business is to be expanded above and beyond its present proportions. Such means and methods have not heretofore been developed.

It is the principal object of this invention to provide mechanical means of automatically and accurately transferring information from a credit card to an invoice form. This invention requires and presupposes the use of a special type of credit card which forms the subject matter of co-pending patent application Serial No. 435,027, filed on June 7, 1954 by Robert E. Hopp. This special type of credit card carries the name of the customer in embossed lettering and his account number is also embossed thereon. In addition, a plurality of holes are punched into the credit card in predetermined relation to each other in accordance with a predetermined code, as employed in connection with International Business Machines equipment and the like. The perforations in the card identify the holder of the card so that he is really identified in two ways, by the embossed lettering and by the perforations. One or more edges or corners of the card may also be cut or shaped in predetermined fashion for purposes which will shortly appear.

The stamping and punching machine herein claimed is adapted to receive a credit card of the character above described and it is also adapted to receive an invoice form consisting of a plurality of invoice sheets interleaved with carbon paper or the like. The machine is provided with press means for forcing the embossed lettering of the credit card against the invoice form so as to impress said invoice form in accordance with said embossed lettering and thereby to cause the carbon paper to mark at least one of the sheets of said invoice form with a marking corresponding to said embossed lettering. The machine is also provided with punching means for punching holes into the invoice form in accordance and registration with the pre-punched holes in the credit card. The machine has a plurality of punches but only those which register with the holes in the credit cards are employed to punch the invoice form. Consequently, it is possible, by inserting a credit card and an invoice form into the machine herein claimed, to transfer the information from the credit card to the invoice form. This may be done by operating the machine with a single lever, as hereinafter described and the entire procedure consumes but several seconds with no possibility whatsoever of error.

An important feature of this invention is the provision of punching means which selectively functions directly through a perforated template in order to punch holes in a recording member in accordance with the number and location of the holes in the template. The conventional use of a perforated template in conjunction with a punching or perforating machine is simply to translate the number and location of the holes in the template electronically and to activate mechanical means, possibly at a remote point from the template itself, to punch holes in a recording member corresponding to the holes in the template. In the present machine, the punches operate directly through the holes in the template and into engagement with the recording member. More specifically, the template is the credit card and the recording member is the invoice form. The credit card is placed at one level in the machine, the invoice form is placed at another level in the machine directly opposite the credit card, the credit card is permitted to select certain punches by simply screening out all punches save those which register with its perforations, and the invoice form is then brought into engagement with said selected punches by means of a die which supports said invoice form and the invoice form is thereby punched in accordance with the perforations in the credit card.

Still another important feature of this invention is the provision of stamping means for stamping the name and address of the individual service station upon the invoice form at the same time that the name and address and account number of the individual customer are stamped thereon. A die or printing plate is installed in the machine herein described for engagement with the invoice form at the time of the punching and stamping or embossing process hereinabove mentioned. In other words, at the moment the information contained on the credit card is transferred to the invoice form, the information on the printing die or plate is also transferred thereto and without any special attention on the part of the operator of the machine.

The invention is illustrated in the accompanying drawing in which.

Figure 3:
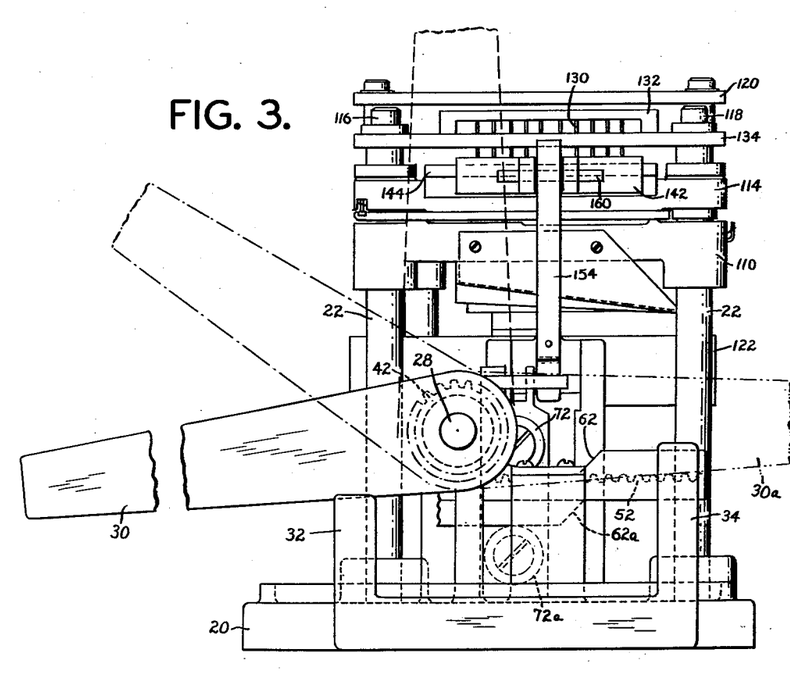
Fig. 3 is a back end view thereof.
Figure 4:
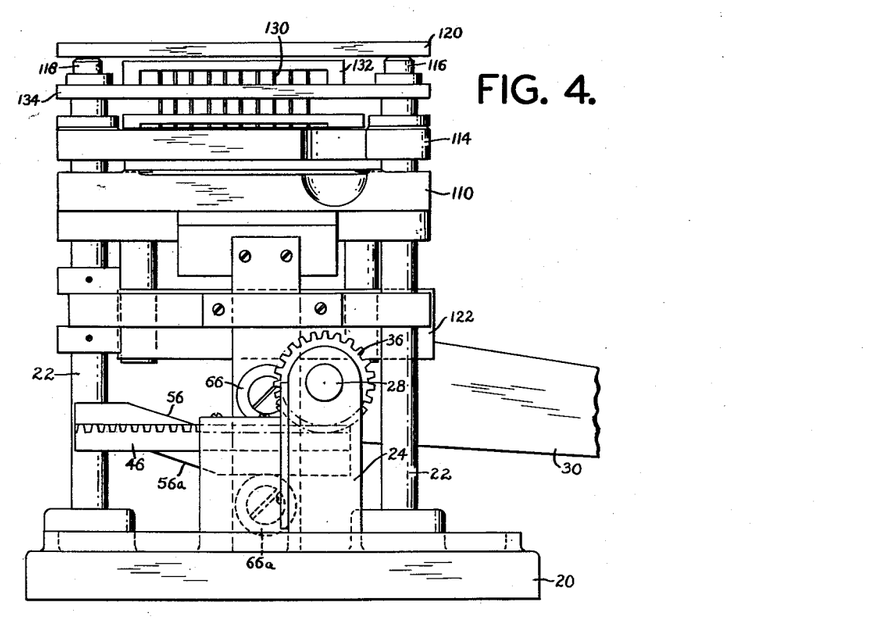
Fig. 4 is a front end view thereof.

The machine herein claimed is provided with a base 20 on which four uprights 22 stand. A pair of bearings 24 and 26 are also supported on base 20 and rotatably mounted in said bearings is a shaft 28 to which a handle 30 is secured. The machine is operated by moving said handle 30 from its solid line position in Fig. 3 wherein it rests against a bracket 32 to its dotted line position 30a also shown in Fig. 3 wherein it rests against a taller bracket 34. As the handle is swung between its two extreme positions, the moving parts of the machine are caused to operate in the manner indicated hereafter.

Figure 1:
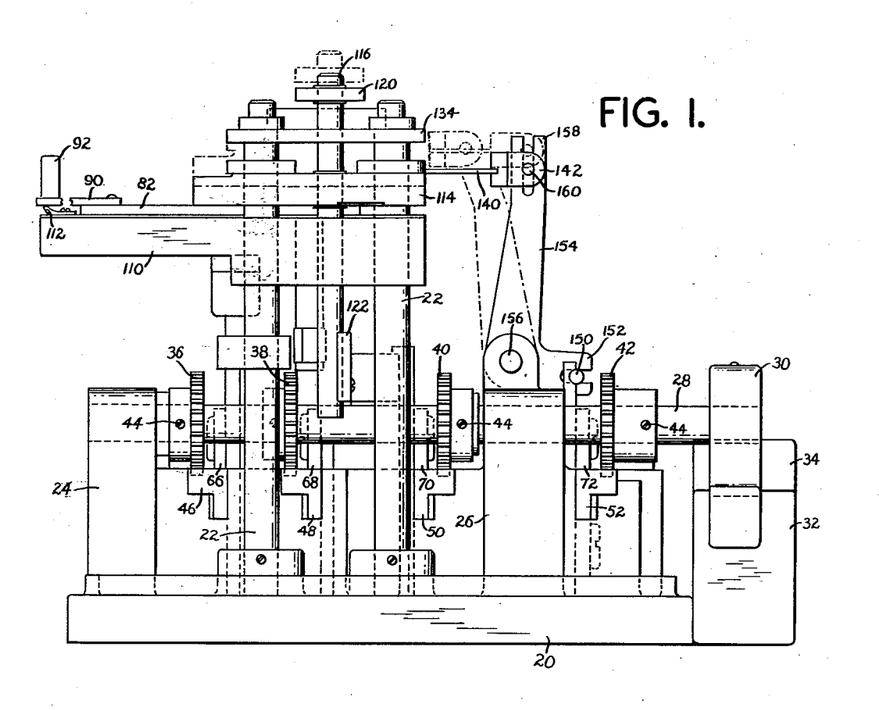
Fig. 1 is a side view of a stamping and punching machine made in accordance with this invention.

Four toothed wheels 36, 38, 40 and 42 are provided on shaft 28. It will be noted that each toothed wheel is provided with a hub and a pin 44 projecting through said hub and into shaft 28 in order to fix said wheels to said shaft and to prevent relative movement therebetween. It will also be noted that these toothed wheels engage, respectively, racks 46, 48, 50, and 52. It will be observed in Figs. 1 and 5 that these racks are all mounted in a common horizontal plane and along parallel lines in said plane. These racks are slidably mounted in tracks provided on base 20 for movement longitudinally of themselves in either direction. Consequently, when handle 30 is operated in one direction, shaft 28 will turn in the same direction and so will all four toothed wheels. As viewed in Fig. 5, for example, when the handle 30 is moved from its position on bracket 32 to its position on bracket 34, shaft 28 and the four toothed wheels will turn in such direction as to cause the four racks to move in the direction of the arrows in Fig. 5. When the handle is swung in the opposite direction, the shaft and toothed wheels will also turn in the opposite direction and the racks will be caused to move against said arrows.

Each rack is provided with a cam structure or face formed integrally therewith or secured thereto. More specifically, rack 46 is provided with a cam portion 56, rack 48 is provided with a cam portion 58, rack 50 is provided with a cam portion 60 and rack 52 is provided with a cam portion 62. It will be seen in Fig. 1 that the several toothed wheels are all of identical diameter and consequently when handle 30 is moved to cause said wheels to turn, all of said racks are made to move longitudinally of themselves, in the same direction, at the same time and at the same rate of speed. The several cam formations on the racks occupy different locations thereon and they are also unequal in length and in their respective angles of inclination. It will be observed in Fig. 5 that these cams engage, respectively, cam rollers or followers 66, 68, 70 and 72, all of identical diameter and axially aligned with each other. The cams engage the cam rollers along a common line which parallels the axis of shaft 28, by reason of this condition, but since the cams are staggered in their respective positions on the several racks, they do not engage the cam followers at the same time. It will therefore be observed that cam 60 will engage cam follower 70 in the first instance, cam 62 will then engage cam follower 72, cam 56 will then engage cam follower 66 and finally cam 58 will engage cam follower 68. There will, however, be some overlapping of cam action, since cam 56 will continue to engage cam follower 66 while cams 62 and 58 are in engagement with their respective cam followers.

Figure 6:
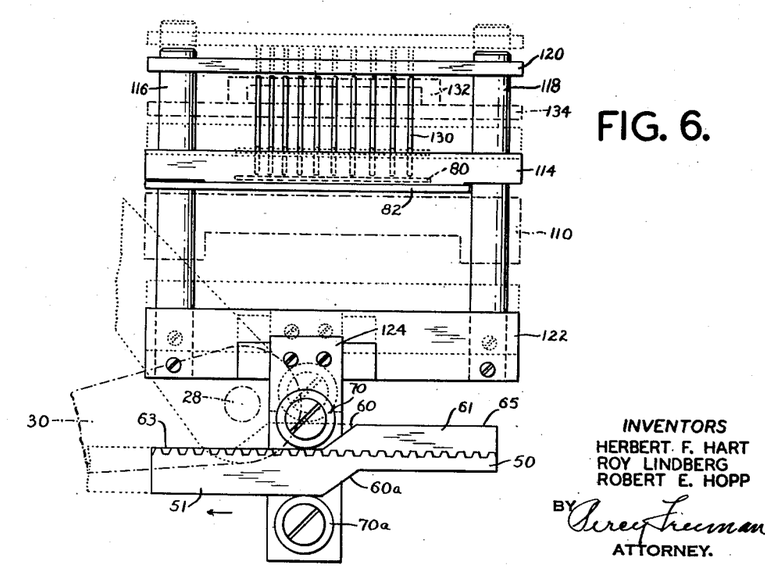
Fig. 6 is a fragmentary view showing the first cam and the components of the machine which it actuates.

Taking rack 50, cam 60 and cam follower 70 as typical of the four units above mentioned, it will be seen in Fig. 6 that said rack includes a downwardly projecting flange 51 and an upwardly projecting flange 61. Flange 51 fits into the track or groove which is provided on the base of the machine to slidably accommodate the rack for its movement in either direction longitudinally of itself. The upper flange 61 has a sloping forward face or ramp which is the cam face 60 above mentioned. Below the cam face is a horizontal portion 63 which supports the cam follower 70 before the cam face engages said cam follower and elevates it out of engagement with said horizontal portion 63. After the cam face elevates the cam follower to a predetermined height, the cam face passes under and out of engagement with the cam follower and the cam follower thereupon rolls upon an upper horizontal portion 65 which supports said cam follower in said predetermined elevated position. What has been said here of rack 50, cam 60 and cam follower 70 is equally true of the other racks, cams and cam followers above mentioned.

Viewing the machine in accordance with the order or sequence of its operation, it will be noted that the first step is to place a credit card 80 on an open platform 82. This platform supports the card along its respective edges but it does not cover the perforations 84 formed in said card, as above indicated, nor does it cover the embossed letters and numbers 86 which are formed on said card, also as above indicated, to provide the name and address or the name and account number or, if desired, the name, address and account number of the holder of the card. The perforations 84 may be circular or rectangular or they may be made in any other desired shape. A cutout 88 is provided in one corner of the card for a purpose which will shortly appear. It will be observed in Fig. 2 that platform 82 has a looped portion 83a which forms an elongated opening 85a. This opening renders it possible for the operator of the machine to insert his finger in order to more easily place the credit card in proper position and also more easily to remove it from the machine.

Pivotally mounted on loop 83a is a locking member 90 which has a handle 92 to operate it. One of the edges of said locking member is provided with a groove 94 adapted to receive the back edge of credit card 80 when said locking member is swung in clockwise direction, as viewed in Fig. 2, into engagement with said card. The locking member is adapted to hold the credit card and to push it inwardly on platform 82 as far as it will go and then to hold it in said position. More specifically, there are two stop pins 83 on platform 82 which are engageable by the forward edge of said credit card 80. There is a third pin 85 on said platform which is situated for engagement with cut-out 88 of credit card 80 when said cut-out is provided in the right place. Each gasoline or oil company issuing credit cards 80 will provide a cut-out 88 in a different location along the forward edge of said card. Also pin 85 will be situated in various positions on platform 82, depending upon which gasoline or oil company is involved in connection with a given machine. The cut-outs of the cards issued by a given oil company will register with and receive pin 85 of the machines in the service stations dealing with said oil company. But the cut-out 88 of the credit card of one company will not register with pin 85 of the recording machine of another company. The side walls or guides on platform 82 will prevent the credit card from canting as it is inserted in the manner aforesaid. Consequently, only a credit card which has a properly located cut-out 88 will be enabled to engage stop pins 83. All other cards will be stopped by pin 85 before they are able to reach pins 83.

Figure 12:
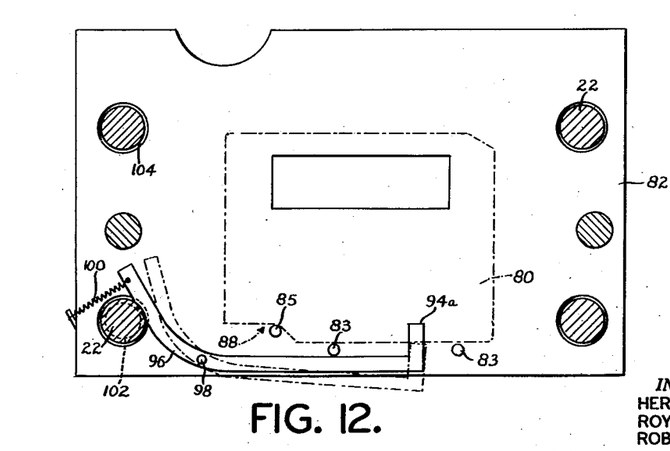
Fig. 12 is a horizontal section through the machine showing a lock which is provided to prevent operation of the machine except when a credit card is inserted therein, an identical lock being provided in connection with the invoice form to prevent operation of the machine except when said form is inserted therein.

It will be seen in Fig. 12 that when the right credit card is inserted into the machine, its forward edge will engage end 94a of bell crank 96 and will cam or push it from one position to another in clockwise direction about its vertical axis 98. When the wrong credit card is inserted into the machine, its leading edge will be unable to reach end 94 of the bell crank and will be unable to swing it in clockwise direction as aforementioned. The opposite end of the bell crank is connected to a tension spring 100 which acts to urge said bell crank to swing in counter-clockwise direction. It will be observed at this point that an annular groove 102 is formed in one of the posts or uprights 22, more particularly the upright or post adjacent said bell crank 96. Bell crank 96 is engageable with said groove 102 and it normally engages said groove under the influence of spring 100. When the credit card is inserted into the machine and then pushed forward by locking member 90 until it reaches pins 83, the bell crank will be swung out of engagement with said groove against the action of said spring.

It will now be understood that bell crank 96 is pivotally supported on platform 82 above mentioned which also supports the credit card 80. Platform 82 is provided with four holes 104 to accommodate the four posts 22, and it is slidably movable vertically of said posts in both directions. However, when bell crank 96 engages groove 102, such vertical movement is prevented and it is only when the credit card disengages the bell crank from the groove that such vertical movement may take place. It may now be stated that invoice form 106 is also provided with a cut-out 108 corresponding to cut-out 88 of the credit card but cut-out 108 may be situated at a different location, if desired. It will further be understood that a second post 22 is also grooved to receive a second bell crank similar to bell crank 96. Said second bell crank is actuated by the invoice form 106 when said invoice form is placed upon platform 110 and moved forwardly thereof. Platform 110 is also slidably mounted on the four uprights for vertical movement thereon and the second bell crank is pivotally mounted on said platform 110 for spring-urged engagement with the groove in the second mentioned upright to lock said platform 110 against vertical movement.

It is only when the invoice form is placed upon said platform 110 and pushed into engagement with said second bell crank that said platform 110 is released for vertical movement. A guide 112 is provided to guide the insertion and positioning of the invoice form and it will also be understood, as above indicated, that parallel side guides are provided both in platform 82 and in platform 110 to engage the side edges of the credit card and invoice form, respectively, to guide them into operative positions.

It will be observed that the invoice form in its simplest form consists of an invoice card 107 and a tear-away invoice sheet 109 secured thereto at one end thereof, and a carbon sheet 111 mounted between said card 107 and said sheet 109. The invoice form is printed both on card 107 and on sheet 109. It will be understood that the invoice form may, if desired, be provided with a second tear-away sheet 109 and a second carbon sheet 111 between the two tear-away sheets. Where the invoice form is printed in duplicate, one copy goes to the customer and one to the gasoline company. When it is printed in triplicate, the third copy is retained by the service station.

A clearer understanding of some of the foregoing statements regarding the functioning of credit card 80 may be had from a study of Fig. 6. It will there be seen that platform 82 is supported by a heavier platform or slide 114 which is slidably mounted on the four uprights 22 for vertical movement in either direction. Secured to slide 114 is a pair of rods 116 and 118 respectively which extend along parallel vertical lines. Secured to the upper ends of rods 116 and 118 is a crossbar 120. Platform 82, card 80 on said platform, slide 114, rods 116 and 118, and crossbar 120 are adapted to move vertically as one integral unit. At the lower ends of rods 116 and 118 is a second crossbar 122 and secured thereto is a bracket 124 which supports cam follower 70. It will now be understood that when handle 30 is operated, and cam 60 engages cam follower 70, the entire assembly last above described, namely, bracket 124, bar 122, the two rods 116 and 118, crossbar 120, slide 114 and platform 82 supporting credit card 80, will be caused to move upwardly from their solid line positions to their dotted line positions as shown in Fig. 6 of the drawing.

It will also be seen in Fig. 6 that a plurality of punches 130 are provided below crossbar 120. These punches are slidably mounted for vertical movement in a bracket 132 supported on platform 134 which, in turn, is mounted on the four uprights 22. These punches all occupy equally spaced or regularly spaced parallel vertical positions. For example, there may be eight rows each consisting of ten punches or ten rows each consisting of eight punches, making a total of eighty punches altogether. This, however, is purely illustrative and the number and arrangement of the punches may be varied as desired. When the assembly last above described is elevated to its dotted line position in Fig. 6, the credit card will engage the lower ends of the punches and push them upwardly, except where the holes in said credit card register with some of said punches and in such case said punches remain in their original positions, projecting through the holes in the credit card. It will hereinafter be seen that these downwardly projecting punches are the ones which form the perforations in the invoice form.

Figure 7:
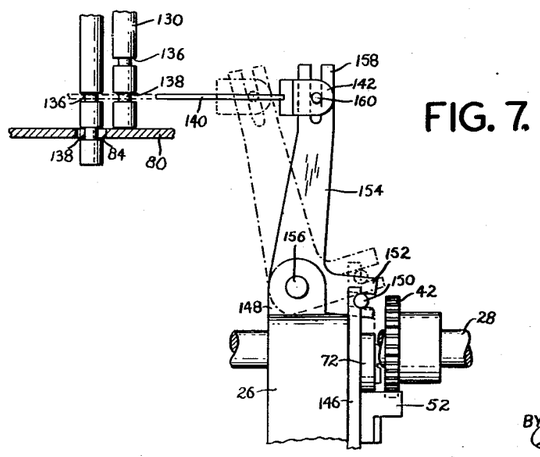
Fig. 7 is another fragmentary view showing the second cam and the machine components which it actuates.

Turning now to Fig. 7, it will be seen that each punch 130 is provided with a pair of annular grooves 136 and 138 respectively. When all of the punches are supported from bracket 132 at the same level, their respective grooves 136 and 138 occupy common, parallel horizontal planes. When the credit card elevates some of these punches but not all of them, the result is shown in Fig. 7 where it will be seen that grooves 138 of the elevated punches will occupy the same plane as grooves 136 of the unelevated punches. The means for pendently supporting the punches from bracket 132 so that they will not fall or drop below a predetermined level is not critical and any suitable means or method may be used for this purpose, for example, simply providing heads at the upper ends of said punches to prevent them from falling through the holes in bracket 132 in which they are mounted.

It will now be understood that grooves 136 and 138 are used for locking purposes to lock the punches in the positions in which they are found following the upward movement of credit card 80. A series of locking bars 140 is provided in a holder 142. These locking bars occupy parallel spaced positions in a common horizontal plane and they form what may be described as a locking comb. There are as many locking bars 140 as there are rows of punches 130 and these locking bars are adapted to enter between said rows of punches to engage the annular grooves of said punches. It will be noted in Fig. 3 that these locking bars 140 project into a guide 144 which is supported on slide 114. Locking bars 140 and their holder 142 are free to move vertically. Consequently, when the assembly shown in Fig. 6 moves upwardly, the locking bars 140 and their holder 142 will also move upwardly with them. Fig. 7 shows the relative positions of the locking bars 140 and the grooves 136, 138 of punches 130 after the assembly has moved to its upper position.

Reference is again made to Fig. 5 and also to Fig. 7. It will be noted that cam 62 is movable into engagement with cam follower 72 and that cam follower 72 is mounted on a bracket 146 that is slidably supported on a mounting 148. A cross pin 150 is affixed to bracket 146 above cam follower 72 and this pin engages the lower bifurcated end 152 of a bell crank 154. Said bell crank is pivotally supported by means of pintle 156 on mounting 148. The upper end 158 of bell crank 154 is also bifurcated to receive a cross pin 160 on holder 142 which supports the locking bars 140. When cam 62 engages cam follower 72, said cam follower and its supporting bracket 146 move upwardly and carry cross pin 150 up with them. This causes the bell crank 154 to tilt in counter-clockwise direction as viewed in Fig. 7 and to thrust the locking bars 140 into engagement with the registering annular grooves formed in the punches. These locking bars 140 are adequately supported in upper and lower guides and consequently they are capable of exerting a strong locking action upon the punches to prevent them from engaging in vertical movement in etither direction once they are engaged by the locking bars.

Figure 5:
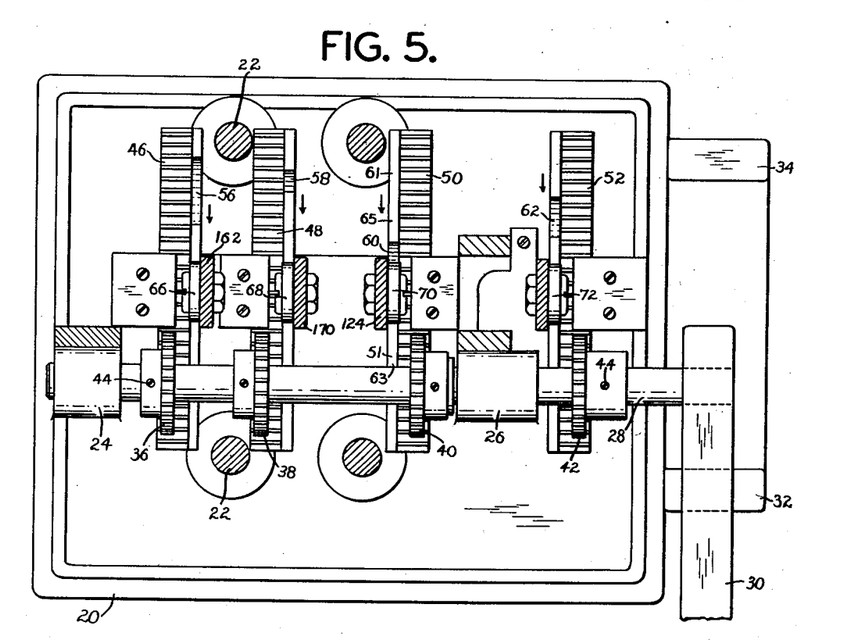
Fig. 5 is a horizontal section therethrough showing the cams of the machine and the racks which activate them.
Figure 8:
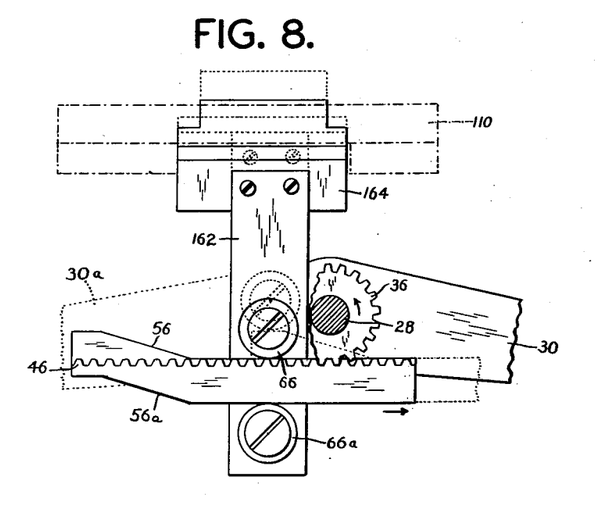
Fig. 8 is still another fragmentary view showing the third cam and the machine components which it actuates.

Attention should now be turned to Figs. 5 and 8 of the drawing. It will now be observed that cam 56 enters into engagement with cam follower 66. Cam follower 66 is mounted on a bracket 162 which supports a ram 164 at its upper end. This ram is perforated in accordance with the number and locations of punches 130 and consequently it functions not only as a ram but also as a die with respect to said punches, as will shortly appear.

Figure 9:
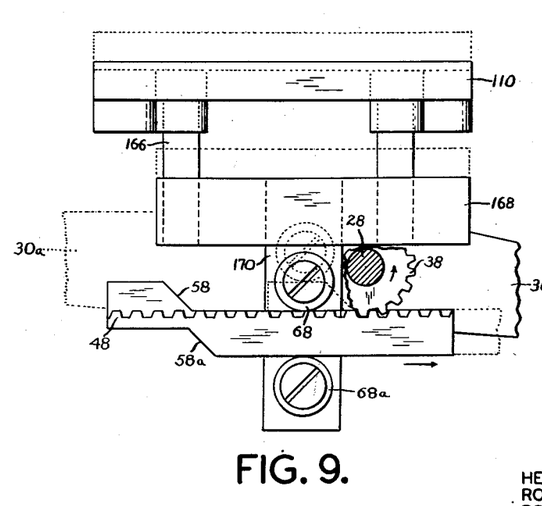
Fig. 9 is a fourth fragmentary view showing the fourth cam and the machine components which it actuates.
Figure 10:
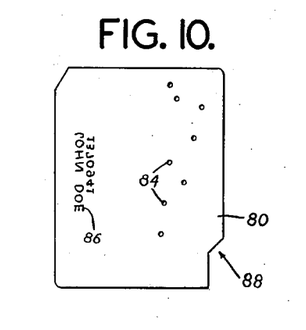
Fig. 10 is a plan view of an embossed and perforated credit card or template used in said machine, showing the reverse side thereof.
Figure 10A:
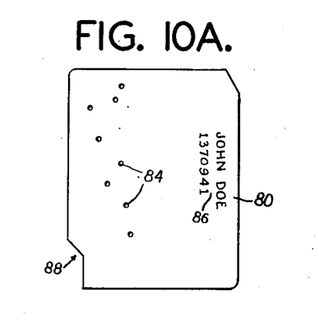
Fig. 10A is a view similar to Fig. 10 but showing the obverse side of the card.

It will be understood at this point that die 164 is moved into engagement with the invoice form and acts to push said invoice form upwardly. It is able to engage said invoice form becasue the platform 110 which supports said invoice form is provided with an opening exposing the invoice form to the die. But since the die engages but a small portion of the invoice form, it is necessary to provide other means which will simultaneously support the rest of the invoice form in its upward movement aforementioned. This additional support is the platform 110 itself and reference is here made particluarly to Fig. 9. Platform 110 is connected by means of posts 166 to a bracket 168 which supports another bracket 170 on which cam follower 68 is mounted. It will now be understood that when cam 58 engages cam follower 68, the assembly shown in Fig. 9, including platform 110, will be moved upwardly. It will now be observed in Fig. 5 that the cams 56 and 58 overlap so that both are in operation at the same time although cam 56 goes into operation before cam 58 and it continues in operation after the operation of cam 58 ceases.

The sequence of events which now takes place is as follows: Die 164 moves upwardly through platform 110 into engagement with the invoice form and commences to move said invoice form upwardly into engagement with the punches which project through the perforations in the credit card. Platform 110 now commences to move upwardly to keep said invoice form in a level position in its upward movement. When the downwardly projecting punches are engaged, further upward movement of the die causes said punches to punch holes in the invoice form. The upward movement of the invoice form continues until it is brought into engagement with the embossed markings on the credit card and said embossed markings are pressed into said invoice form and more particularly into card 107 thereof, thereby embossing said card and causing its embossments to press against the carbon paper 111. The embossments thereby become coated with carbon ink and are rendered completely legible. It will be understood at this point that a printing die or stamp bearing the name and address or other identification marking identifying the service station making the sale may be provided in the machine to mark the invoice form accordingly at the same time that it is marked to identify the customer. This may be done in many ways as, for example, placing a thin printing die across the open platform 82 which supports the credit card, between the embossments thereon and the perforations therein. Consequently, when die 164 presses the invoice form against the embossments on the credit card, it will also press said invoice form against said thin die last mentioned, thereby identifying the service station on the invoice form. Another method of achieving this result is simply to engrave the die 164 itself in the manner of a printing die or to emboss the same with raised lettering so that said die 164 itself will, upon engaging the invoice form and pressing it against the credit card will impress said invoice form with information identifying the service station.

Figures 2, 11:
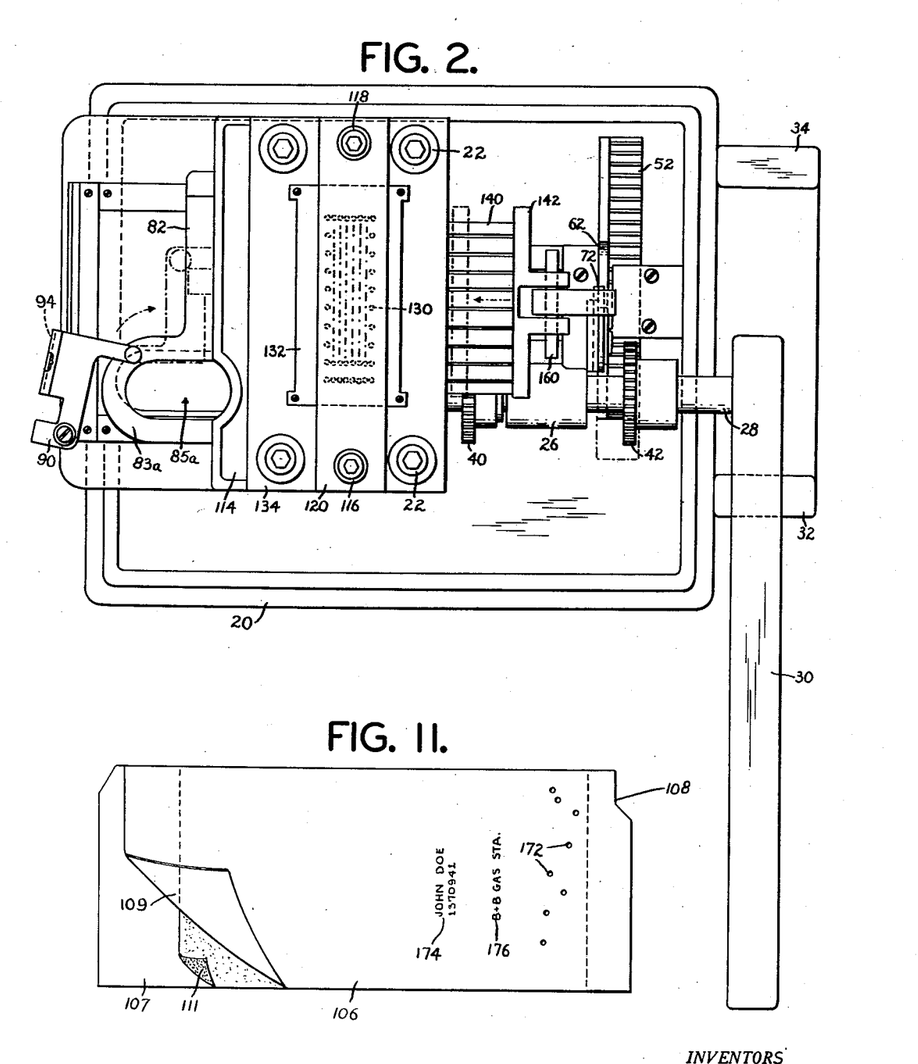
Fig. 2 is a top view thereof.
Fig. 11 is a plan view of an invoice form used in conjunction therewith, one of the leaves of said invoice form being curled upwardly at one of its corners to expose a sheet of carbon paper between said leaf and the main leaf or card of said invoice form.

Referring to Fig. 11, it will be seen that the invoice form is provided, following the operation above described, with perforations 172 corresponding to the perforations on the credit card, with markings 174 identifying the customer and with markings 176 identifying the service station. All that the service station attendant need now do is to mark on the invoice form the specific items involved in the sale and the amount of the sale. The customer will sign the invoice form and especially sheet 109 thereof and his signature will be transferred to card 107 by means of the carbon paper 111. When sheet 109 is handed to the customer and card 107 is retained by the service station for delivery to the gasoline or oil company, the transaction is completed.

The foregoing presupposes that the credit card and invoice form are removed from the machine, the credit card to be returned to the customer and the invoice form to be filled out, signed and a part delivered to the customer and a part retained by the service station, substantially as above described. This may be done by simply operating handle 30 in the opposite direction and causing the several racks to move in the direction opposite the arrows in Fig. 5. It will now be seen that the downwardly extending flange 51 of rack 50 as shown in Fig. 6 performs a very definite function in connection with returning the machine to its original position preparatory to conducting the next transaction. Cam follower 70 is opposed by a second cam follower 70a which is mounted on the same support and which is engageable with a cam 60a situated opposite cam 60. Cam 60a is formed on flange 51 precisely as cam 60 is formed on flange 61. When the rack moves leftwardly as viewed in Fig. 6, cam 60 will engage cam follower 70 to elevate the assembly therein shown. When the rack is retracted and caused to move rightwardly as viewed in Fig. 6, cam 60a will engage cam follower 70a and the assembly shown in said figure will be drawn downwardly. This is equally true of all of the other racks, cams and cam followers shown in the drawing. Thus, opposing cam 56 is a second cam 56a and opposing cam follower 66 is a second cam follower 66a, opposing cam 58 is a second cam 58a, opposing cam follower 68 is a second cam follower 68a, opposing cam 62 is a second cam 62a and opposing cam follower 72 is a second cam follower 72a. It will also be seen that when the assembly shown in Fig. 6 is returned to the solid line position, the downward movement of crossbar 120 will restore all the elevated punches 130 to their initial position ready for the next cycle of operation.

The foregoing illustrates a preferred form of this invention and it will be understood that variations and modifications may be incorporated therein within the broad spirit of the invention and the broad scope of the claims.

What is claimed is:

1. A recording machine for transferring information from a perforated credit card or the like to an imperforate invoice form or the like, comprising a plurality of longitudinally movable punches, an open platform supporting said credit card at the ends of said punches, means connected to said open platform to move said credit card against said punches to displace to inactive position all of said punches which do not register with the perforations in said credit card, while leaving undisturbed in active position those punches which do register with said perforations, means to lock said latter punches in said active position, a second open platform supporting the invoice form opposite said credit card, a die mounted adjacent said second open platform for movement therethrough toward and into engagement with said undisturbed punches, and means connected to said second platform and said die to cause them to move in the direction of said undisturbed punches, said die thereby engaging said invoice form and perforating the same on said undisturbed punches while said second open platform carries said invoice form in operative position for said perforating operation.

2. A recording machine for transferring information from a perforated credit card or the like to an imperforate invoice form or the like, comprising a plurality of longitudinally movable punches, an open platform supporting said credit card opposite said punches, said open platform being movable toward said punches to bring the credit card into engagement therewith and thereby to displace to inactive position those punches which do not register with the perforations in the credit card while leaving undisturbed and in inactive position those punches which do, means to lock said undisturbed punches in their active position, a second open platform supporting the invoice form opposite said credit card, and a die mounted adjacent said second open platform, said die being movable through said second open platform to engage said invoice form and to press said invoice form against the undisturbed punches, thereby perforating said invoice form in accordance with the perforations in the credit card.

3. A recording machine in accordance with claim 2 wherein the punches are provided with an upper notch which is in alignment with said locking means when the punches are in active or undisturbed position, and with a lower notch which is aligned with said locking means when the punches are in inactive or disturbed position, the dimension or space between the bottom of the punch and the lower notch being equal to the space between the lower and upper notches and equal to the degree of displacement by the credit card of those punches which do not register with the holes in the credit card, said locking means comprising bar elements which move into all said notches that are aligned in the plane of movement of said locking means, to lock the punches against movement prior to the perforating operation.

4. A recording machine in accordance with claim 2 for use with a perforated credit card or the like which is provided with embossed indicia, wherein the die is positioned for engagement with those portions of the invoice form which are disposed opposite the perforations and embossments in the credit card, whereby movement of the die to bring the invoice form in engagement with the undisturbed punches also brings said invoice form into engagement with the embossed indicia on the credit card to emboss said invoice form thereon.

5. A recording machine in accordance with claim 2, wherein a plurality of staggered horizontally movable cams are provided in said machine and means for simultaneously moving them in a common direction, cam followers being provided for engagement with said cams, one said cam follower being connected to the first open platform to move said first open platform and the credit card which it supports in the direction of and into engagement with the punches, a second cam follower being connected to said die to cause it to move through the second open platform and into engagement with the invoice form and undisturbed punches.

6. A recording machine in accordance with claim 5, wherein the second open platform is mounted for movement in the same direction as the die to carry the invoice form toward the undisturbed punches while the die causes said invoice form to engage said undisturbed punches, a third cam follower being provided which is connected to said second open platform to cause it to move in the direction of movement of the die while the second cam follower causes said die to move in the direction of the undisturbed punches.

7. A machine for imprinting type letters on and perforating a copy sheet under control of a master card containing raised printing letters and perforations arranged in a code pattern comprising a master card support, a copy sheet support, a plurality of individually longitudinally movable plungers adapted to enter said perforations, means for effecting relative motion between the master card support and the plungers to effect entry of at least some of said plungers into said perforations, means to lock at least said latter plungers against further movement, a punch for each of the plungers movable therewith, means for effecting relative approach motion between said copy sheet and said punches of the plungers that extend into said perforations in the master card to perforate the copy sheet, and means for pressing said copy sheet and raised printing letters together to imprint said letters on the copy sheet.

8. A machine according to claim 7 wherein said punches are situated at the ends of said plungers, and the said means for effecting relative approach motion between the copy sheet and the punches includes a perforated die plate that is separate from and situated alongside of the said means for pressing the copy sheet and printing letters together to act upon different portions of the copy sheet.

References Cited in the file of this patent

UNITED STATES PATENTS

| | | |
|---|---|---|
| 1,108,492 | Eggart | Aug. 25, 1914 |
| 1,919,219 | Hoffman | July 25, 1933 |
| 2,132,412 | Gollwitzer | Oct. 11, 1938 |
| 2,134,815 | Elliott | Nov. 1, 1938 |
| 2,225,297 | Connor | Dec. 17, 1940 |
| 2,515,124 | Hilton | July 11, 1950 |
| 2,589,271 | Miller | Mar. 18, 1952 |
| 2,620,726 | Torkelson | Dec. 9, 1952 |
| 2,664,815 | Schuessler | Jan. 5, 1954 |